United States Patent [19]
Clark et al.

[11] Patent Number: 6,078,482
[45] Date of Patent: Jun. 20, 2000

[54] DATA STORAGE CARTRIDGE WITH RELEASABLE SHUTTER ASSEMBLY

[75] Inventors: Jon R. Clark, Minneapolis; John W. Swanson, Mahtomedi, both of Minn.

[73] Assignee: Imation Corp., Oakdale, Minn.

[21] Appl. No.: 09/173,952

[22] Filed: Oct. 16, 1998

[51] Int. Cl.[7] .................................................. G11B 23/03
[52] U.S. Cl. ............................................................ 360/133
[58] Field of Search .............................. 360/133; 369/291

[56] References Cited

U.S. PATENT DOCUMENTS

| | | | |
|---|---|---|---|
| 4,503,475 | 3/1985 | Hall | 360/137 |
| 4,504,879 | 3/1985 | Toldi et al. | 360/105 |
| 4,683,506 | 7/1987 | Toldi et al. | 360/105 |
| 4,717,981 | 1/1988 | Nigam et al. | 360/133 |
| 4,722,012 | 1/1988 | Toldi et al. | 360/97 |
| 4,864,437 | 9/1989 | Couse et al. | 360/75 |
| 4,864,452 | 9/1989 | Thompson et al. | 360/133 |
| 4,870,518 | 9/1989 | Thompson et al. | 360/97.01 |
| 4,901,173 | 2/1990 | Jones et al. | 360/99.04 |
| 5,218,503 | 6/1993 | Martin | 360/133 |
| 5,280,403 | 1/1994 | Martin | 360/133 |
| 5,377,065 | 12/1994 | Morehouse et al. | 360/105 |
| 5,381,402 | 1/1995 | Lee et al. | 369/291 |
| 5,408,374 | 4/1995 | Morehouse et al. | 360/105 |
| 5,426,562 | 6/1995 | Morehouse et al. | 361/685 |
| 5,442,266 | 8/1995 | Morehouse et al. | 318/272 |
| 5,481,420 | 1/1996 | Cardona et al. | 360/99.06 |
| 5,558,291 | 9/1996 | Anderson et al. | 242/336 |
| 5,572,383 | 11/1996 | Hoshi et al. | 360/99.05 |
| 5,579,189 | 11/1996 | Morehouse et al. | 360/105 |
| 5,592,349 | 1/1997 | Morehouse et al. | 360/98.08 |
| 5,610,779 | 3/1997 | Kawana | 360/99.04 |
| 5,610,780 | 3/1997 | Nishizawa | 360/99.04 |
| 5,610,782 | 3/1997 | Tomoe et al. | 360/99.04 |
| 5,610,891 | 3/1997 | Choi | 369/77.2 |
| 5,612,940 | 3/1997 | Otsuka et al. | 369/77.2 |
| 5,636,095 | 6/1997 | McGrath et al. | 360/133 |
| 5,664,991 | 9/1997 | Barton, II | 451/65 |
| 5,666,347 | 9/1997 | Yoshida et al. | 369/282 |
| 5,671,109 | 9/1997 | Sumner et al. | 360/133 |
| 5,917,803 | 12/1999 | Goto et al. | 369/291 |
| 6,005,755 | 12/1999 | Muse et al. | 360/133 |

FOREIGN PATENT DOCUMENTS

| | | | |
|---|---|---|---|
| 0 721 187 A2 | 7/1996 | European Pat. Off. | G11B 33/12 |
| WO 94/11873 | 5/1994 | WIPO | G11B 17/08 |
| WO 94/29852 | 12/1994 | WIPO | G11B 5/012 |
| WO 94/29862 | 12/1994 | WIPO | G11B 21/08 |
| WO 98/49684 | 11/1998 | WIPO | G11B 23/03 |

OTHER PUBLICATIONS

U.S. application No. 09/067,399, Clark et al., filed Apr. 28, 1998.

*Primary Examiner*—Robert S. Tupper
*Attorney, Agent, or Firm*—Eric D. Levinson

[57] ABSTRACT

A removable data storage cartridge having a releasable shutter assembly. The shutter assembly rotatably maintains a data storage media and includes a first half and a second half. In this regard, at least a portion of an outer periphery of the first half is configured to releasably engage at least a portion of an outer periphery of the second half. With this configuration, the first half can easily be disassembled from the second half for replacing the media if found to be defective. In one preferred embodiment, the shutter assembly further includes a hinge integrally formed with the first half and the second half for facilitating axial assembly of the first half to the second half.

13 Claims, 6 Drawing Sheets

DATA STORAGE CARTRIDGE WITH RELEASABLE SHUTTER ASSEMBLY

BACKGROUND OF THE INVENTION

The present invention relates to a data storage cartridge. More particularly, it relates to a removable data storage cartridge having an independent shutter assembly configured to facilitate rapid removal of a data storage media.

Removable data storage cartridges, and in particular disk media cartridges, have been used for decades to record large volumes of information for subsequent retrieval and use. Constant improvements in media, cartridge design and manufacturing techniques have resulted in removable data storage cartridges of reduced size able to store increasing amounts of information at a decreased cost. To remain competitive, data storage cartridge manufacturers must continually strive to make further improvements in these areas.

While a wide variety of different designs exist, a data storage cartridge generally consists of a cartridge housing, a data storage media, and a mechanism to protect the data storage media when the cartridge is not in use. Typically, this protective mechanism is referred to as a shutter. Many shutters are designed to expose an opening (or window) in the cartridge housing by moving translationally, i.e., in a straight line. One example of such a shutter is provided in connection with a micro-floppy diskette that includes a circular magnetic data storage media having a diameter of 3.375 inches (85.8 mm).

Shutter design has more recently evolved to provide a shutter that rotates to expose a portion of the data storage media. With this approach, the overall size of the data storage cartridge can be decreased because the shutter and cartridge housing can more closely follow the contours of the disc-shaped or circular media, while also allowing a head actuator mechanism to position itself over the data recording area of the disk.

Rotatable-type or rotary shutters are normally quite intricate and require a number of independent parts to affect the design. Due to the relatively large number of components, rotary shutters are typically expensive to fabricate. One example of such a cartridge and rotary shutter design is disclosed in U.S. Pat. No. 5,636,095 to McGrath et al. The rotary shutter assembly is normally designed to enclose a circular segment of the media and typically includes a top half and a bottom half, along with other components. Normally, the shutter top and bottom are permanently secured about the data storage media. Alternatively, the shutter top and bottom may be permanently secured to the cartridge housing. With either approach, a subsequent finding that the data storage media is defective results in scrapping of the entire product.

For example, where the shutter assembly is permanently secured to the cartridge housing, it is impossible to test the media independent of the cartridge housing. In other words, the shutter assembly cannot be disassembled from the cartridge housing for testing. Subsequently, if it is determined that the media is defective, the entire cartridge, including cartridge housing and shutter assembly, must be discarded, resulting in a total loss. This same dilemma arises where the shutter assembly is permanently secured about the media. Once again, if the data storage media is found to be defective, the entire shutter assembly must be scrapped.

Data storage cartridges, and in particular removable data storage cartridges, are important tools used to maintain vast amounts of information. To this end, cost of manufacturing is an important consideration for removable data storage cartridge manufacturers. Any benefit in terms of reduced manufacturing costs, including costs of testing and scrap, are extremely important. Therefore, a substantial need exists for a data storage cartridge having an independent shutter assembly designed to facilitate rapid assembly and testing of the data storage media.

SUMMARY OF THE INVENTION

The present invention provides a removable data storage cartridge in which the data storage media is enclosed within an independent shutter assembly. The shutter assembly includes a top and bottom half that are releasably secured to one another. With this design, the shutter assembly can be readily disassembled to allow replacement of the data storage media if found to be defective. Further, in one preferred embodiment, the top and bottom halves are integrally connected by a hinge that facilitates final assembly of the shutter assembly about the data storage media, while at the same time reducing the number of components.

One aspect of the present invention provides a removable data storage cartridge that includes a data storage media, a shutter assembly and a cartridge housing. The data storage media is preferably in the form of a circular disc. The shutter assembly encloses a portion of the data storage media whereby the media is mounted for rotation within the shutter assembly about an axis of rotation. To this end, the shutter assembly includes a first half and a second half. The first and second halves form a shutter window for providing access to the enclosed media. Further, at least a portion of an outer periphery of the first half is configured to releasably engage at least a portion of an outer periphery of the second half. With this configuration, the first half is movable relative to the second half between an engaged position in which the first and second halves maintain the media, and a disengaged position in which the media can be removed. The cartridge housing encloses at least a portion of the shutter assembly and the media, such that the shutter assembly is mounted for rotation within the cartridge housing about the axis of rotation. Finally, the cartridge housing forms a cartridge window for providing access to the shutter assembly and the media. In one preferred embodiment, the shutter assembly further includes a hinge connecting the first half to the second half. With this configuration, the first half can be pivoted relative to the second half at the hinge to provide selective access to the enclosed media.

Another aspect of the present invention relates to a method of manufacturing a removable data storage cartridge. The method includes providing a data storage media comprising a circular disc. A shutter assembly is then provided. The shutter assembly includes a first half and a second half, each of which are sized to receive the media. Further, the first half is configured to be releasably secured to the second half. The media is placed in the first half of the shutter assembly. The second half of the shutter assembly is disposed about the media, in axial alignment with the first half, such that the second half is releasably secured to the first half. Finally, the shutter assembly and the enclosed media are located within a cartridge housing. In one preferred embodiment, the shutter assembly further includes a hinge portion, and the step of providing a shutter assembly includes forming the first half, the second half and the hinge portion as an integral body.

Yet another aspect of the present invention relates to a method of inspecting a removable data storage cartridge. The removable data storage cartridge includes a data storage media, a shutter assembly and a cartridge housing. The data storage media preferably comprises a circular disc and is partially enclosed within the shutter assembly. To this end, the shutter assembly rotatably maintains the media and includes a first half releasably secured to a second half. The cartridge housing encloses at least a portion of the shutter assembly and the media, the shutter assembly mounted for rotation within the cartridge housing about the axis of rotation. With this in mind, the method of inspecting includes positioning the shutter assembly apart from the cartridge housing. The media otherwise maintained within the shutter assembly is then tested. In particular, a determination is made as to whether the media is defective. If the media is defective, the first half of the shutter assembly is released from the second half. The defective media is replaced with a new media. The first half is then releasably secured to the second half to enclose a portion of the new media. Finally, the shutter assembly, including the new media, is inserted into the cartridge housing.

DETAILED DESCRIPTION OF THE PREFERRED EMBODIMENTS

Figure 1:
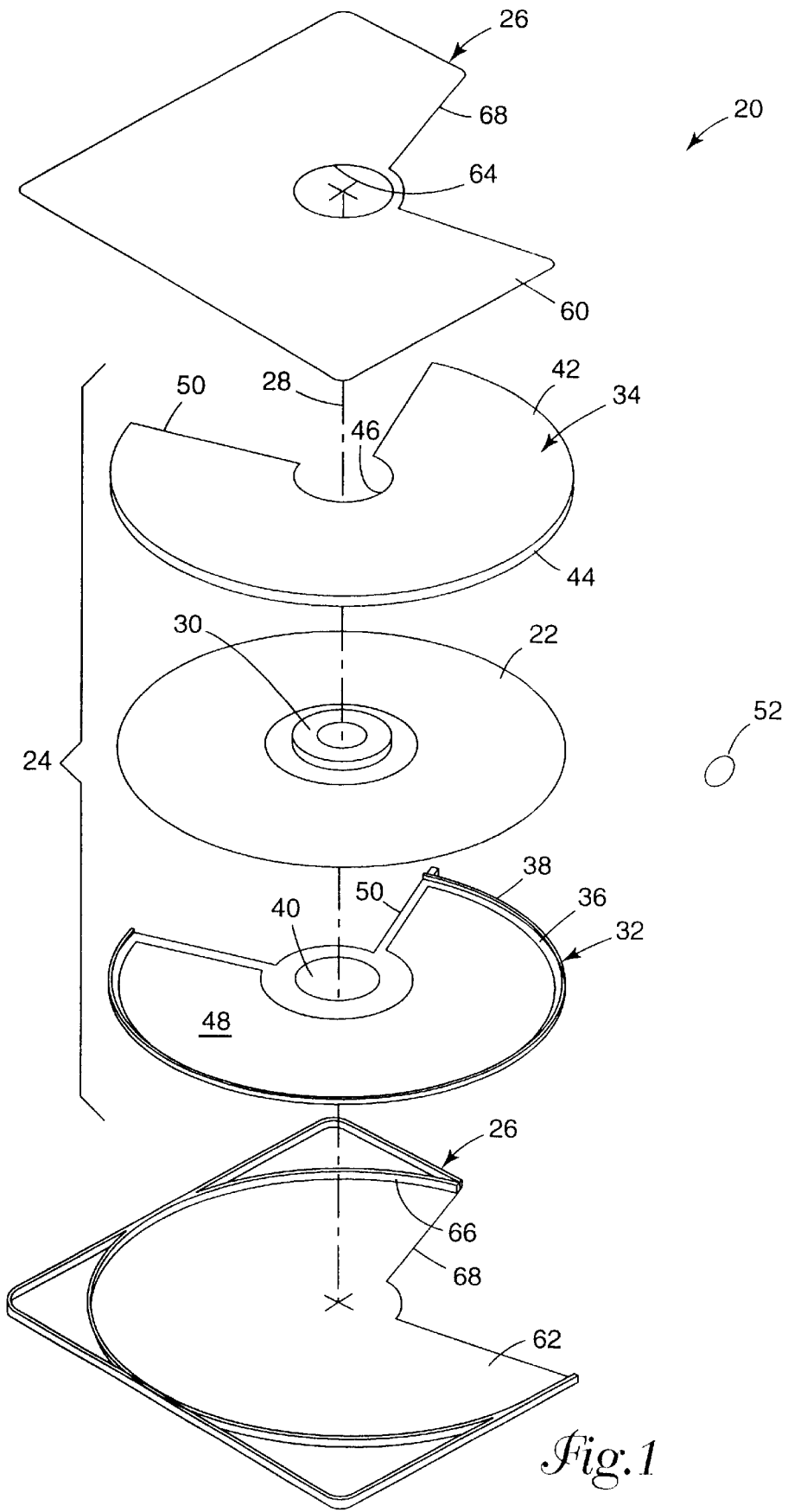
FIG. 1 is an exploded perspective view of a removable data storage cartridge in accordance with the present invention.

One preferred embodiment of a removable data storage cartridge 20 is shown in FIG. 1. The removable data storage cartridge 20 is generally comprised of a data storage media 22, a shutter assembly 24 and a cartridge housing 26. Details on the various components of the removable data storage cartridge 20 are provided below. In general terms, however, the data storage media 22 is maintained within, and partially encompassed by, the shutter assembly 24. In this regard, the data storage media 22 is preferably rotatably mounted within the shutter assembly 24 such that the data storage media 22 is rotatable about an axis of rotation 28 defined by, for example, a hub 30. The shutter assembly 24, in turn, is maintained within the cartridge housing 26 such that the shutter assembly 24 is rotatable about the axis of rotation 28.

The data storage media 22 is preferably in the form of a generally circular disc. The data storage media 22 is preferably a flexible magnetic data storage media, but could alternatively be rigid. Furthermore, although magnetic media is preferred, the data storage media 22 could also store data by any suitable technique including, but not limited to, optical, combinations of optical and magnetic data storage, near-field recording, etc.

As previously described, the data storage media 22 is preferably attached to the hub 30 that is used to rotate the data storage media 22 during read/write operations. The preferred hub 30 can be manufactured from any suitable material including, but not limited to, metals such as aluminum or stainless steel, plastics, composites, etc.

The shutter assembly 24 is described in greater detail below. In general terms, however, the shutter assembly 24 includes a first half 32 and a second half 34. In a preferred embodiment, the first half 32 is a shutter bottom or bottom half, whereas the second half 34 is a shutter top or top half Alternatively, the design of the removable data storage cartridge 20 can be such that the first half 32 forms a shutter top or top half, whereas the second half 34 is a shutter bottom or bottom half. As used throughout this specification, directional terminology such as "top," "bottom," "upward," "downward," etc. are with reference to the particular figure being described. It should be understood that use of these terms is for clarity only, and that the removable data storage cartridge 20, including the shutter assembly 24 and any other components, may actually be orientated in any direction relative to the world in general. As such, these terms are not meant to serve as limitations.

The bottom half 32 and the top half 34 of the shutter assembly 24 are preferably configured to be located on opposing sides of the data storage media 22. In this regard, the bottom half 32 includes a face 36 and a side wall 38. In a preferred embodiment, a wear disc 40 is formed on an inside surface of the face 36. The wear disc 40 preferably provides a surface having a desired amount of friction against which the hub 30 rotates during use. In this regard, the wear disc 40 preferably has a relatively low coefficient of static friction.

The top half 34 of the shutter assembly 24 also includes a face 42 and a side wall 44. The face 42 preferably forms a spindle opening 46. The spindle opening 46 is sized to allow a drive spindle (not shown) of a disk drive to contact the hub 30 otherwise attached to the data storage media 22.

The embodiment depicted in FIG. 1 shows a cleaning liner 48 is attached to an inside surface of the face 36 of the bottom half 32. The cleaning liner 48 is provided to remove debris from a surface of the data storage media 22 during rotation within the shutter assembly 24. It should be recognized that while not shown, a second cleaning liner is preferably located on an inner surface of the face 42 of the top half 34.

Attachment of the bottom half 32 to the top half 34 is described in greater detail below. As shown in FIG. 1, however, a combination of the bottom half 32 with the top half 34 forms a shutter window 50. The shutter window 50 is configured to expose a portion of the data storage media 22 otherwise disposed within the shutter assembly 24. In one preferred embodiment, the shutter window 50 exposes a circular segment of the data storage media 22. In this regard, it is preferred that the shutter window 40 expose less than half of the data storage media 22 such that the shutter window 50 exposes an arc of less than 180 degrees of an outer circumference of the data storage media 22. With this preferred configuration, the shutter assembly 24 is able to retain the data storage media 22 by interference, i.e., that the data storage media 22 is prevented from slipping out of the shutter assembly 24 without some deformation of the data storage media 22. It should be recognized, however, that the shutter window 50 may assume other shapes and sizes.

In one preferred embodiment, the bottom half 32 and the top half 34 are preferably connected by a hinge 52. As described below, the hinge 52 is preferably integrally formed with the bottom half 32 and the top half 34, although is shown apart from the bottom and top halves 32, 34 in FIG. 1 for purposes of illustration. Alternatively, the hinge 52 may be a separate component separately secured to the bottom half 32 and the top half 34. The hinge 52 allows the first half 32 to pivot relative to the second half 34, and vice-versa. The hinge 52 is spaced from the shutter window 50. In one preferred embodiment, the hinge 52 is positioned opposite the shutter window 50, although any other location is acceptable.

The cartridge housing 26 includes a cartridge housing base 60 and a cartridge housing cover 62. The cartridge housing base 60 and the cartridge housing cover 62 are configured to be reciprocally mated to one another and form an enclosure within which the shutter assembly 24 (including the data storage media 22) is located. The cartridge housing 26 is preferably sized to be received by an associated disk drive (not shown), and thus can assume a variety of dimensions.

In a preferred embodiment, the cartridge housing base 60 includes a spindle opening 64 through which a drive spindle (not shown) of a disk drive can access the hub 30 otherwise attached to the data storage media 22 during operation. It is preferred that the spindle opening 64 in the cartridge housing base 60 be generally aligned along the axis of rotation 28 with the spindle opening 46 in the top half 34 of the shutter assembly 24.

The cartridge housing cover 62 preferably includes a retaining ring 66 configured to assist in retaining the shutter assembly 24 in a proper position during assembly. It is preferred that the retaining ring 66 encircle more than half of an outer circumference of the shutter assembly 24. Although one preferred retaining ring 66 is depicted as being continuous in the embodiment shown in FIG. 1, it should be understood that the retaining ring 66 can be provided as a number of separate portions defining a generally circular cavity in which the shutter assembly 24 is located when the removable data storage cartridge 20 is assembled. Notably, use of the retaining ring 66 is but one technique for securing the shutter assembly 24 within the cartridge housing 26, and other approaches are equally acceptable. For example, U.S. Pat. No. 5,636,095 provides another design for capturing a shutter assembly. Alternatively, the shutter assembly 24 can be retained by use of a pin assembly, shutter extension, or other retention mechanism. The shutter assembly 24 of the present invention is useable with these, or many other cartridge housing configurations.

Attachment of the cartridge housing base 60 to the cartridge housing cover 62 can be achieved by any suitable technique including, but not limited to, ultrasonic or laser welding, adhesives, mechanical fasteners, etc. Regardless of the exact attachment method, upon final assembly, the cartridge housing base 60 and the cartridge housing cover 62 combine to form a cartridge window 68. In one preferred embodiment, the cartridge window 68 forms a generally circular segment as shown in FIG. 1. It is preferred, but not required, that both the cartridge housing base 60 and the cartridge housing cover 62 within the area of the cartridge window 68 be removed to expose both sides of the shutter assembly 24.

Figure 2:
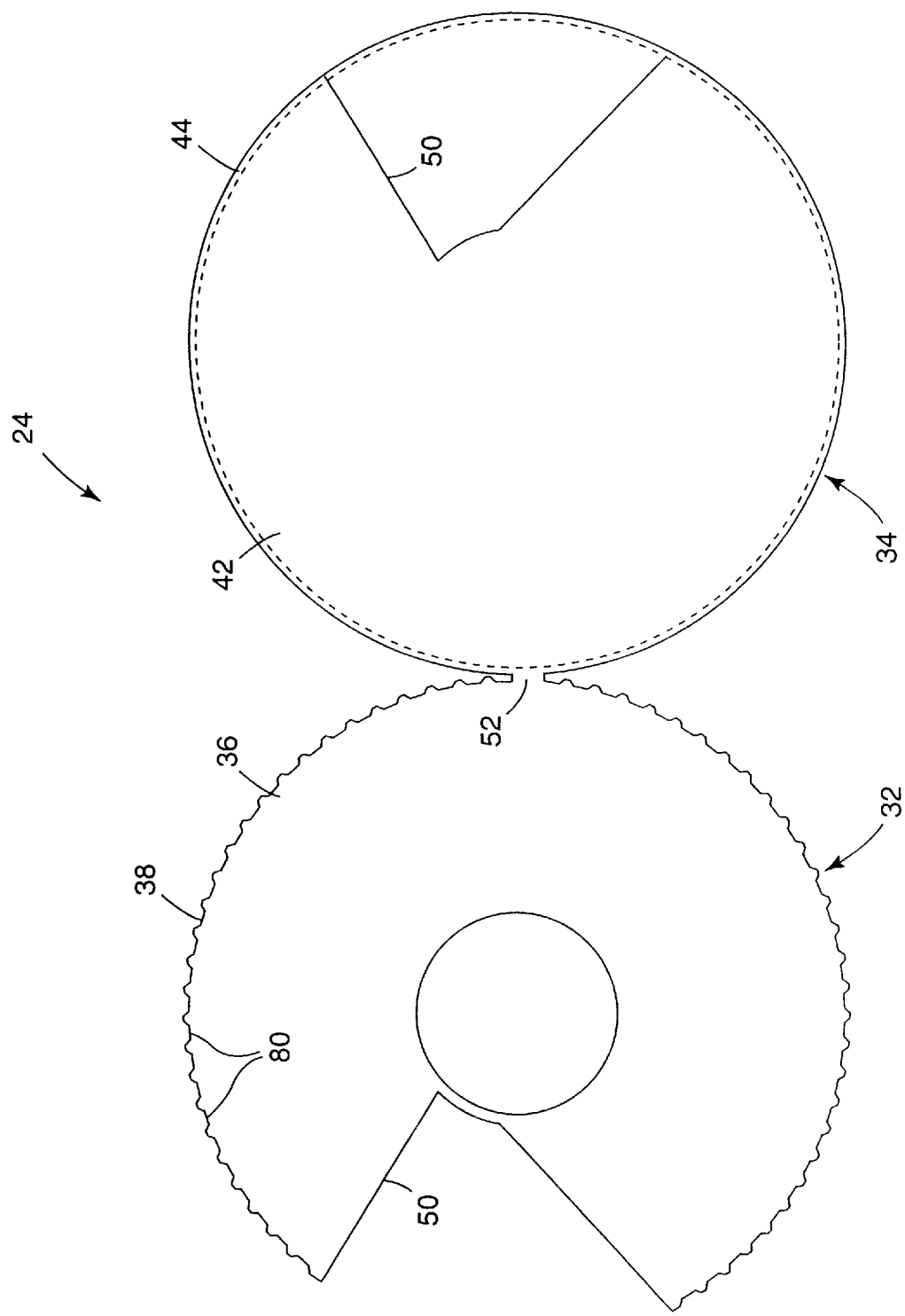
FIG. 2 is an enlarged plan view of a shutter assembly of the removable data storage cartridge of the present invention.

The shutter assembly 24, and in particular the bottom half 32, the top half 34 and the hinge 52, is shown in greater detail in FIG. 2. As a point of reference, the shutter assembly 24 is depicted in FIG. 2 in a disengaged position whereby the top half 34 is pivoted away from the bottom half 32. In an engaged position, the top half 34 is pivoted into engagement with the bottom half 32 such that the top and bottom halves 32, 34 are axially aligned.

As shown in FIG. 2, the bottom half 32, the top half 34 and the hinge 52 are preferably manufactured as an integral body. For example, the bottom half 32, the top half 34 and the hinge 52 can be formed via a stamping process from a sheet metal material such as aluminum or stainless steel. Alternatively, the shutter assembly 24 can be formed from a molded plastic. Regardless, the hinge 52 is preferably a thin, bendable material connecting the bottom half 32 to the top half 34. With this configuration, the top half 34 can be repeatedly moved from a disengaged position (FIG. 2) to an engaged position in which the bottom half 32 and the top half 34 are releasably mated to one another at various points along the respective side walls 38, 44. While the hinge 52 has been shown as preferably being located opposite the shutter window 50, any other location spaced from the shutter window 50 is equally acceptable. Notably, with the preferred manufacturing method of forming the bottom half 32, the top half 34 and the hinge 52 as an integral body, the number of components required for the shutter assembly 24 is reduced.

As previously described; the bottom half 32 and the top half 34 are preferably configured to be releasably securable at various points at about the respective outer peripheries. In other words, the bottom half 32 and the top half 34 are permanently connected at one point by the hinge 52. The hinge 52 allows the bottom half 32 and the top half 34 to pivot between a disengaged position (FIG. 2) and an engaged position. In the engaged position, the bottom half 32 is secured to the top half 34 at points apart from the hinge 52. Because the bottom half 32 is releasably attached to the top half 34, the shutter assembly 24 can be maneuvered back to the disengaged position by pivoting the top half 34 relative to the bottom half 32 at the hinge 52.

The above-described releasable engagement of the bottom half 32 to the top half 34 is achieved, in one preferred embodiment, via configuration of the respective side walls 38, 44. As a starting point, the face 36 of the bottom half 32 and the face 42 of the top half 34 are generally circular in shape. To this end, the bottom half face 36 and the top half face 42 are sized to receive the data storage media 22 (FIG. 1), and thus each have a diameter greater than a diameter of the data storage media 22.

With the above dimensional constraint in mind, in one preferred embodiment, the top half face 42 has a diameter slightly greater than a diameter of the bottom half face 36. As a result, the top half side wall 44 will encircle the bottom half side wall 38 when the bottom half 32 is assembled, in axial alignment, to the top half 34 in the engaged position. To ensure a tight fit between the bottom half side wall 38 and the top half side wall 44, the bottom half side wall 38 is preferably biased radially outwardly, whereas the top half side wall 44 is biased radially inwardly. As a result of this preferred biasing, the respective side walls 38, 44 are effectively biased toward one another such that upon final assembly in the engaged position, the bottom half side wall 38 engages the top half side wall 44.

Figure 3A:
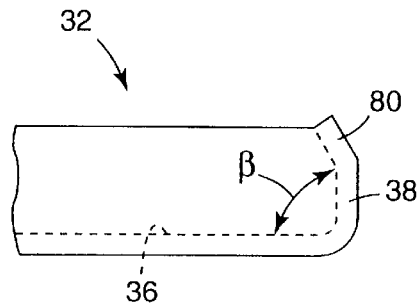
FIG. 3A is an enlarged, partial cross-sectional view of a portion of a shutter bottom of FIG. 2 taken along the line A—A in FIG. 2.

One preferred embodiment of the bottom half 32, including the bottom half side wall 38 is shown in FIG. 3A. The bottom half side wall 38 extends from the bottom half face 36, forming an obtuse angle therewith. For example, the bottom half side wall 38 preferably extends from the bottom half face 36 at an angle (β in FIG. 3A) in the range of approximately 91–110 degrees; more preferably 95 degrees. Effectively, the bottom half side wall 38 has a diameter greater than a diameter of the bottom half face 36. Additionally, in one preferred embodiment, a plurality of tabs 80 extend from the bottom half side wall 38 opposite the bottom half face 36. One of the plurality of tabs 80 is shown in FIG. 3A. in a preferred embodiment, each of the plurality of tabs 80 is virtually identical, and is configured to facilitate assembly of the top half 34 (FIG. 2) to the bottom half 32. In this regard, each of the plurality of tabs 80 forms an angle with the bottom half side wall 38 in the range of approximately 130–160 degrees; more preferably 145 degrees. With this configuration, the top half side wall 44 (FIG. 2) is guided along the plurality of tabs 80 into engagement with the bottom half side wall 38. As shown in FIG. 2, the plurality of tabs 80 may be uniformly spaced along the entire circumference of the bottom half side wall 38. Alternatively, the plurality of tabs 80 may be randomly positioned at only a few points along the bottom half side wall 38. Even further, the plurality of tabs 80 may be omitted entirely.

Figure 3B:
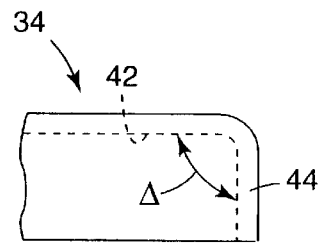
FIG. 3B is an enlarged, partial cross-sectional view of a portion of a shutter top of FIG. 2 taken along the line B—B in FIG. 2.

One preferred embodiment of the top half 34, including the top half side wall 44, is shown in FIG. 3B. The top half side wall 44 extends from the top half face 42, forming an acute angle therewith. In one preferred embodiment, the top half side wall 44 forms an angle (Δ in FIG. 3B) with the top half face 42 in the range of approximately 70–89 degrees; more preferably 85 degrees. Effectively, the top half side wall 44 has an outer diameter less than a diameter of the top half face 42. Notably, to facilitate bending of the top half side wall 44 relative to the top half face 42, the top half side wall 44 need not necessarily be continuous, but instead can be formed as a plurality of fingers forming a relatively continuous structure following bending.

Figure 3C:
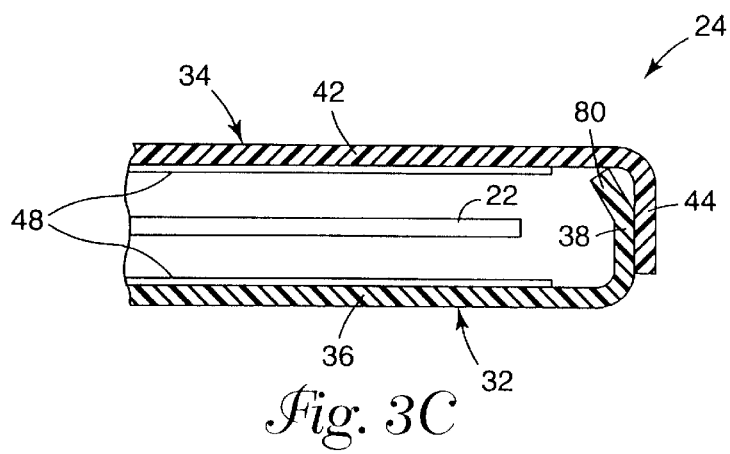
FIG. 3C is an enlarged, partial cross-sectional view of a shutter assembly in accordance with the present invention.

The above-described construction facilitates releasable attachment of the bottom half 32 to the top half 34 as best shown in FIG. 3C. The top half 34 is placed axially over the bottom half 32 such that a leading end of the top half side wall 44 contacts the plurality of tabs 80. As the top half 34 is continually moved closer to the bottom half 32, the top half side wall 44 slides along the plurality of tabs 80 and is directed toward the bottom half side wall 38. In the final, engaged position shown in FIG. 3C, the top half side wall 44 encompasses the bottom half side wall 38. Further, due to the radially outward extension of the bottom half side wall 38 and the radially inward extension of the top half side wall 44, a tight fit between the bottom half side wall 38 and the top half side wall 44 is achieved. As shown in FIG. 3, in the engaged position, the bottom half 32 and the top half 34 encompass the data storage media 22 and include the cleaning liner 48. Notably, the bottom half 32 and the top half 34 are easily separated by maneuvering the top half side wall 44 axially away from the bottom half side wall 38. This process of opening and closing the bottom half 32 relative to the top half 34 can be repeated numerous times, such that the bottom half 32 is releasably securable to the top half 34.

Figure 3D:
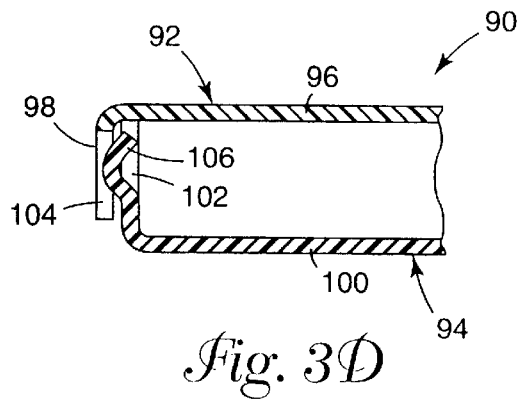
FIG. 3D is an enlarged, partial cross-sectional view of an alternative shutter assembly in accordance with the present invention.

It should be recognized that the above-described configuration of the bottom half side wall 38 and the top half side wall 44 is but one acceptable technique for achieving a releasable attachment between the bottom half 32 and the top half 34. For example, an alternative embodiment of a shutter assembly 90 including a top half 92 and a bottom half 94 is shown in FIG. 3D. As a point of reference, the shutter assembly 90 is shown without the cleaning liner 48 (FIG. 1) or the data storage media 22 (FIG. 1). Similar to the previous embodiment, the top half 92 includes a top half face 96 and a top half side wall 98. Similarly, the bottom half 94 includes a bottom half face 100 and a bottom half side wall 102. As shown in FIG. 3D, the top half side wall 98 extends from the top half face 96 in a generally perpendicular fashion. The top half side wall 98 further forms a plurality of openings 104, one of which is shown in FIG. 3D. The bottom half side wall 102 extends from the bottom half face 100 in a generally perpendicular fashion. Additionally, the bottom half side wall 102 forms a plurality of spring loaded fingers 106, one of which is shown in FIG. 3D. The plurality of spring loaded fingers 106 are positioned and spaced to correspond with the plurality of openings 104 in the top half side wall 98. Effectively, each of the spring loaded fingers 106 is biased radially outwardly such that upon final construction in the engaged position of FIG. 3D, each of the spring loaded fingers 106 extends into one of the plurality of openings 104, thereby securing the top half 92 to the bottom half 94. With this construction, the top half 92 can be disassembled from the bottom half 94 by simply separating the top half side wall 98 from the bottom half side wall 102 such that the plurality of spring loaded fingers 106 disengage from the plurality of openings 104.

Returning to FIG. 1, the removable data storage cartridge 20 is assembled by placing the data storage media 22 and the hub 30 within the shutter assembly 24. The shutter assembly 24 is then maneuvered from a disengaged position to an engaged position in which the top half 34 is secured axially to the bottom half 32, thereby encompassing the data storage media 22 and associated hub 30. In the preferred embodiment in which the shutter assembly 24 includes the hinge 52 (best shown in FIG. 2), pivoting of the top half 34 into engagement with the bottom half 32 can be facilitated with a thin, flat mandrel or arbor (not shown).

Figure 4:
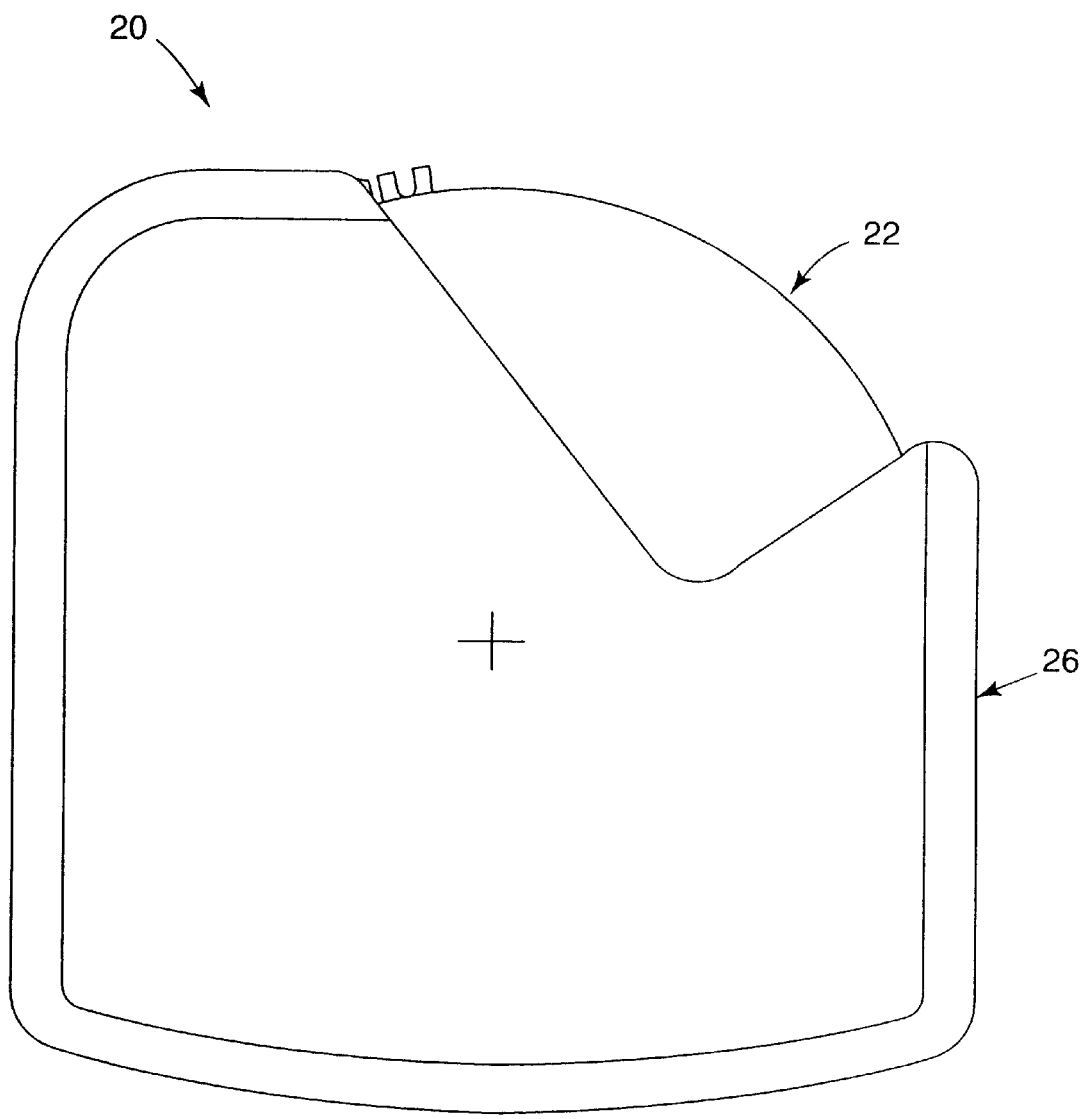
FIG. 4 is a plan view of a removable data storage cartridge in accordance with the present invention.

Once encompassed by the shutter assembly 24, the data storage media 22 can be tested. If any defects are found, the shutter assembly 24 is maneuvered from an engaged position to a disengaged position by disengaging the respective side walls 38, 44. Notably, it is only necessary to hinge the top and bottom halves 32, 34 at approximately 30 degrees (or less) to access the data storage media 22. The defective data storage media is replaced with a new data storage media 22, and the shutter assembly 24 is once again returned to the engaged position. Finally, the shutter assembly 24 is secured within the cartridge housing 26. In particular, the shutter assembly 24, including the enclosed data storage media 22, is located between the cartridge housing base 60 and the cartridge housing cover 62. It is preferred that the shutter assembly 24 rotate freely within the cartridge housing base and cover 60, 62. The cartridge housing base 60 is attached to the cartridge housing cover 62 by any suitable technique including, but not limited to, ultrasonic or laser welding, adhesives, mechanical fasteners, etc. The final, constructed removable data storage cartridge 20 is shown in FIG. 4.

Figure 5:
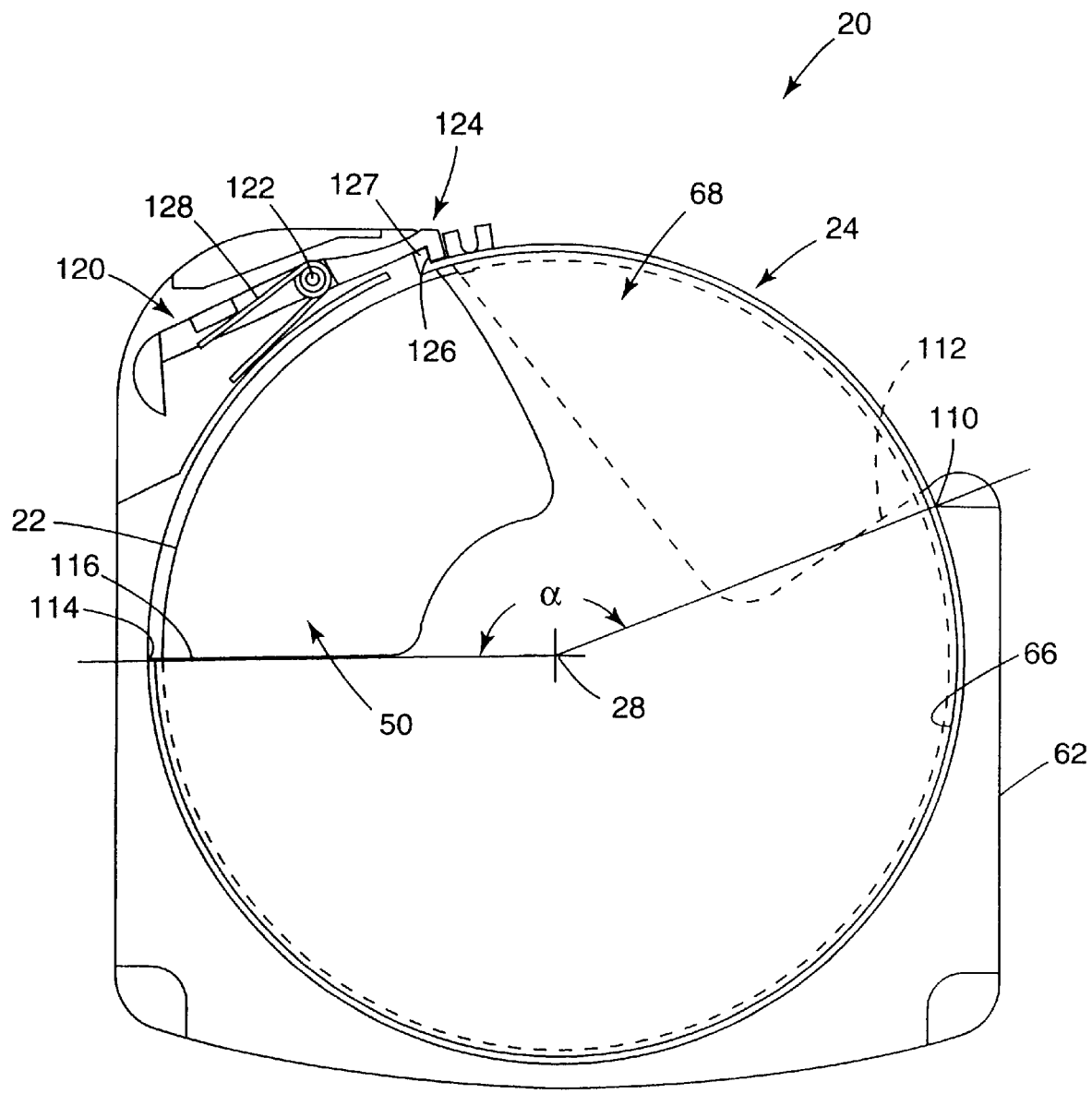
FIG. 5 is a plan view of a removable data storage cartridge in accordance with the present invention, with the cartridge housing cover removed and the shutter assembly in the closed and latched position.

In FIG. 5, the cartridge housing base 60 has been removed, exposing the relationship between the shutter assembly 24 and the retaining ring 66 in the cartridge housing cover 62 of the illustrated removable data storage cartridge 20. The retaining ring 66 preferably terminates at a point 110 proximate a first edge 112 of the cartridge window 68. When the shutter assembly 24 is in a closed position as depicted in FIG. 5, the intersection point 114 between a trailing edge 116 of the shutter window 50 and an outer circumference of the shutter assembly 24 is located within the area of the retaining ring 66.

To adequately retain the shutter assembly 24 within the area defined by the retaining ring 66, the included angle α formed by point 114, the axis of rotation 28 and the point 110 is preferably less than about 180 degrees, more preferably less than about 170 degrees, and even more preferably less than about 160 degrees. By limiting angle a to those values, the shutter assembly 24 is retained within the cartridge housing 26 by interference between the outer circumference of the shutter assembly 24 and the inner surface of the retaining ring 66. If these limits are not maintained, then, in some positions, the shutter assembly 24 may allow the outer circumference of the data storage media 22 to contact the retaining ring 66. That contact could cause wrinkling or other undesired deformation of the data storage media 22.

Also depicted in FIG. 5 is one preferred latching mechanism for retaining the shutter assembly 24 in the closed position. The preferred latch mechanism illustrated in FIG. 5 includes an arm 120 mounted for rotation about a pivot 122. At one end, the arm 120 includes a latch end 124 designed to cooperate with the shutter assembly 24 to prevent the shutter assembly 24 from rotating to an open position. In the illustrated embodiment, the latch end 124 of the arm 120 includes a hook 126 that mates with a catch 127 on the shutter assembly 24 to prevent rotation of the shutter assembly 24.

The arm 120 is preferably mounted on the pivot 122 such that it is biased for rotation in the clockwise direction in FIG. 5. The preferred embodiment includes a torsion spring 128 to provide the biasing force, although those skilled in the art will recognize that the biasing force on the arm 120 can be provided by a variety of mechanisms including, but not limited to, coil springs, leaf springs, etc.

Figure 6:
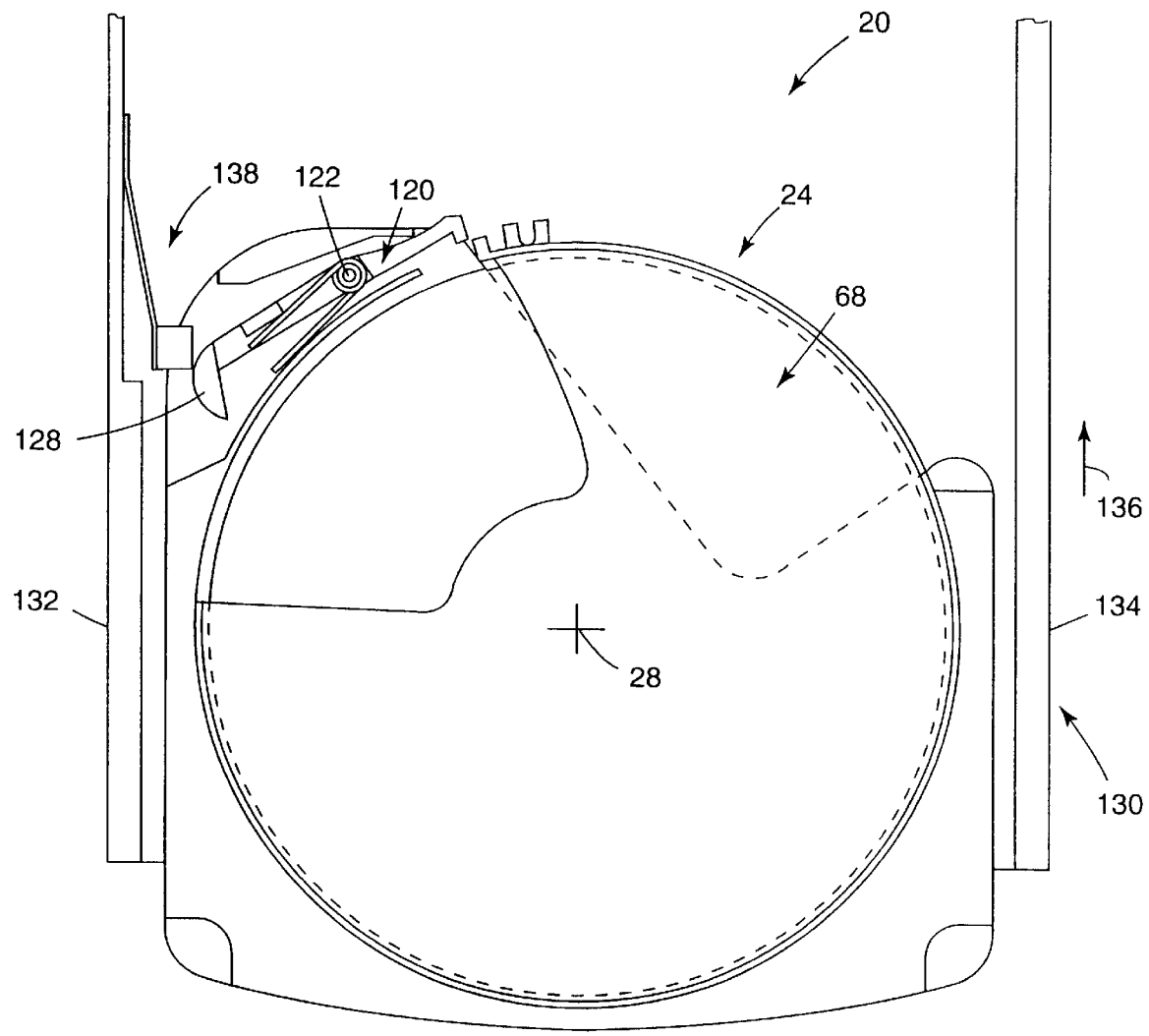
FIG. 6 is a plan view of the removable data storage cartridge of FIG. 5 with the shutter assembly unlatched and partially open.

FIG. 6 illustrates the opening of the latch mechanism to allow for rotation of the shutter assembly 24 about the access of rotation 28. As the removable data storage cartridge 20 is inserted into a drive 130 defined by side walls 132 and 134, and moved in the direction indicated by arrow 136, an actuator 138 located within the side walls 132, 134 of the drive 130 is forced against the actuating end 128 of the arm 120. The actuator 138 forces the arm 120 to rotate counterclockwise about the pivot 122, i.e., the actuator 138 causes the arm 120 to rotate against it's biasing force. That movement causes the latching mechanism to disengage, thereby allowing the shutter assembly 24 to rotate within the removable data storage cartridge 20.

Actual rotation of the shutter assembly 24 between the open and closed positions is caused, in the depicted embodiment, by a pin (not shown) that engages with a notch on the shutter assembly 24 to rotate it about the axis of rotation 28 such that the data storage media 22 is exposed within the cartridge window 68. That same notch and pin are also used to rotate the shutter assembly 24 into the closed position. A similar design for moving a rotary shutter between the open and closed positions can be found in, for example, U.S. Pat. No. 5,636,095 to McGrath et al. Other means for rotating the shutter assembly 24 between the open and closed positions will be known to those skilled in the art. Further, we recognize that the latch mechanism described is but one acceptable approach.

The removable data storage cartridge of the present invention provides a marked improvement over previous designs. In particular, by incorporating an independent shutter assembly defined by two releasably securable halves, significant cost savings can be achieved. For example, during assembly, it is now possible for a user to remove and replace defective data storage media without destroying the entire shutter assembly. This procedure is further simplified by connecting the top and bottom halves of the shutter assembly with a hinge. In this regard, by manufacturing the bottom half, top half and hinge as a single, integral body, the overall number of necessary components required for the shutter assembly is reduced.

Although the present invention has been described with reference to preferred embodiments, workers skilled in the art will recognize that changes may be made in form and detail without departing from the spirit and scope of the invention. For example, while the shutter assembly has been preferably described as including a hinge, this component is not a necessary element. Instead, the advantages found by providing a shutter assembly having a first or bottom half releasably securable to a second or top half are achieved without the use of a hinge. Similarly, while the bottom and top halves have been preferably described as being secured along an entire circumference or outer periphery of the respective side walls, the area of attachment may be limited to one or more points along the outer.

What is claimed is:

1. A removable data storage cartridge comprising:
   a data storage media comprising a circular disc;
   a shutter assembly enclosing a portion of the media, the media mounted for rotation within the shutter assembly about an axis of rotation, the shutter assembly including:
      a first half,
      a second half, and
      wherein the first and second halves form a shutter window and wherein at least a portion of an outer periphery of the first half is configured to releasably engage at least a portion of an outer periphery of the second half;
   a cartridge housing enclosing at least a portion of the shutter assembly and the media, the shutter assembly mounted for rotation within the cartridge housing about the axis of rotation; and
   a cartridge window formed in the cartridge housing.

2. The removable data storage cartridge of claim 1, wherein the first half includes a first half face and a first half side wall, and the second half includes a second half face and a second half side wall, and further wherein at least a portion of the first half side wall is configured to releasably engage at least a portion of a second half side wall.

3. The removable data storage cartridge of claim 2, wherein the first half face and the second half face are generally circular, the first half face having a diameter slightly less than a diameter of the second half face.

4. The removable data storage cartridge of claim 3, wherein the first half side wall is biased radially outwardly relative to the first half face for engaging the second half side wall.

5. The removable data storage cartridge of claim 4, wherein the second half side wall is biased radially inwardly relative to the second half face.

6. The removable data storage cartridge of claim 2, wherein at least a portion of the first half side wall forms an obtuse angle relative to the first half face for engaging the second half side wall.

7. The removable data storage cartridge of claim 6, wherein at least a portion of the second half side wall forms an acute angle relative to the second half face.

8. The data storage cartridge of claim 2, wherein the first half further includes at least one tab extending from the first half side wall opposite the first half face, the at least one tab extending inwardly for guiding the second half side wall into engagement with the first half side wall.

9. The removable data storage cartridge of claim 1, wherein the shutter assembly further includes a hinge connecting the first half to the second half.

10. The removable data storage cartridge of claim 9, wherein the hinge includes a bendable material extending from the first half to the second half.

11. The removable data storage cartridge of claim 9, wherein the first half, the second half and the hinge are an integral body.

12. The removable data storage cartridge of claim 9, wherein the hinge is spaced from the shutter window.

13. The removable data storage cartridge of claim 12, wherein the hinge is positioned approximately opposite the shutter window.

* * * * *